(12) United States Patent
Gomez Ruiz et al.

(10) Patent No.: US 8,512,480 B2
(45) Date of Patent: Aug. 20, 2013

(54) LIQUID DETERGENT COMPOSITION COMPRISING A HYDROPHOBICALLY MODIFIED CELLULOSIC POLYMER

(75) Inventors: Maria Angeles Gomez Ruiz, Grimbergen (BE); Polina Zosimova, Strombeek-Bever (BE); Bahar Koyuncu, Strombeek-Bever (BE)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 12/391,288

(22) Filed: Feb. 24, 2009

(65) Prior Publication Data

US 2009/0186796 A1 Jul. 23, 2009

Related U.S. Application Data

(63) Continuation of application No. PCT/IB2009/050126, filed on Jan. 13, 2009.

(30) Foreign Application Priority Data

Jan. 22, 2008 (EP) .................................. 08 150 489

(51) Int. Cl.
| | | |
|---|---|---|
| *B08B 3/04* | (2006.01) | |
| *C11D 1/14* | (2006.01) | |
| *C11D 1/75* | (2006.01) | |
| *C11D 3/222* | (2006.01) | |

(52) U.S. Cl.
USPC ......... 134/25.2; 134/25.3; 510/220; 510/235; 510/426; 510/433; 510/473

(58) Field of Classification Search
USPC .................. 510/220, 235, 426, 433, 473, 503; 134/25.2, 25.3
See application file for complete search history.

(56) References Cited

U.S. PATENT DOCUMENTS

| | | | |
|---|---|---|---|
| 2,503,280 A | 4/1950 | Lockwood | |
| 2,507,088 A | 5/1950 | Bradley | |
| 3,260,744 A | 7/1966 | Ito et al. | |
| 3,372,188 A | 3/1968 | Alston et al. | |
| 3,915,903 A | 10/1975 | Wise | |
| 4,100,094 A | 7/1978 | Burns et al. | |
| 4,136,038 A | 1/1979 | Pracht et al. | |
| 4,532,067 A * | 7/1985 | Padron et al. .................. 510/424 |
| 4,683,004 A | 7/1987 | Goddard | |
| 5,798,505 A | 8/1998 | Lee | |
| 5,866,529 A | 2/1999 | Erilli et al. | |
| 6,008,181 A | 12/1999 | Cripe et al. | |
| 6,020,303 A | 2/2000 | Cripe et al. | |
| 6,060,443 A | 5/2000 | Cripe et al. | |
| 6,274,540 B1 | 8/2001 | Scheibel et al. | |
| 6,380,150 B1 | 4/2002 | Toussaint et al. | |
| 6,514,926 B1 | 2/2003 | Kott et al. | |
| 6,521,577 B1 | 2/2003 | Clarke et al. | |
| 6,583,096 B1 | 6/2003 | Kott et al. | |
| 6,602,480 B1 | 8/2003 | Mori | |
| 6,767,880 B1 * | 7/2004 | Foley et al. ................... 510/419 |
| 6,803,355 B1 | 10/2004 | Panandiker et al. | |
| 2002/0028976 A1 | 3/2002 | Connor | |
| 2002/0082182 A1 | 6/2002 | Kott et al. | |
| 2002/0103096 A1 | 8/2002 | Kott et al. | |
| 2003/0144545 A1 | 7/2003 | Connor et al. | |
| 2007/0249514 A1 | 10/2007 | Midha | |
| 2007/0275868 A1 | 11/2007 | Cooremans et al. | |

FOREIGN PATENT DOCUMENTS

| | | | |
|---|---|---|---|
| EP | 0 100 125 A2 | 2/1984 | |
| EP | 1 010 421 A1 | 6/2000 | |
| GB | 1 566 326 A1 | 4/1980 | |
| JP | S63-161083 A | 7/1988 | |
| JP | 2001213762 A | 8/2001 | |
| WO | WO 91/13138 | * | 9/1991 |
| WO | WO 91/13138 A | 9/1991 | |
| WO | WO 99/05084 A1 | 2/1999 | |
| WO | WO 2006/041740 A1 | 2/2006 | |
| WO | WO 2006/041740 | * | 4/2006 |

OTHER PUBLICATIONS

Int'l Search Report PCT/2009/050126, Apr. 23, 2009.

* cited by examiner

*Primary Examiner* — Brian P Mruk

(74) *Attorney, Agent, or Firm* — John T. Dipre; David V. Upite

(57) ABSTRACT

The present invention relates to a light duty liquid detergent composition comprising a low molecular weight hydrophobically modified cellulosic polymer, to provide improved foaming properties.

7 Claims, No Drawings

LIQUID DETERGENT COMPOSITION COMPRISING A HYDROPHOBICALLY MODIFIED CELLULOSIC POLYMER

CROSS REFERENCE TO RELATED APPLICATION

This application is a continuation of International Serial No. PCT/IB2009/050126 filed Jan. 13, 2009.

FIELD OF INVENTION

The present invention relates to a light duty liquid detergent composition comprising a low molecular weight hydrophobically modified cellulosic polymer, to provide improved foaming properties.

BACKGROUND OF THE INVENTION

Light-duty liquid dishwashing detergent compositions require a high suds profile while providing grease cleaning. This is particularly important with respect to liquid dishwashing detergent compositions as the consumer uses foam as an indicator of the performance of the detergent composition. Moreover, the consumer in a liquid dishwashing detergent composition also uses the sudsing profile and the looks of the foam (density, whiteness) as an indicator that the wash solution still contains active detergent ingredients. The consumer usually doses the dishwashing liquid depending of the foam ability and renews the wash solution when the sudsing subsides or when the foam does not look thick enough. Thus, a liquid dishwashing detergent composition that generates little or a low density foam will tend to be replaced by the consumer more frequently than is necessary. Therefore, commercially successful light duty liquid dishwashing compositions need to exhibit both good foam height, density as well as good foam duration during both the initial mixing of the detergent into water; as well as good foam duration during the manual dishwashing operation.

Natural polymers such as cellulosic polymers are commonly used as rheology modifiers for liquid detersive compositions. For example, WO2007/119226 discloses a rheology modifying system for detersive compositions, comprising a combination of clay with an anionic polymer or a cellulosic polymer.

It has surprisingly been found that the formulation of a low molecular weight hydrophobically modified cellulosic polymer in a light duty liquid dishwashing composition, provides increased suds mileage and foam density.

Furthermore, it has been found that the light-duty liquid dishwashing detergent composition of the present invention provides improved grease cleaning, in particular on the more difficult baked-on grease layer.

SUMMARY OF THE INVENTION

The present application relates to a liquid detergent composition comprising a hydrophobically modified cellulosic polymer with a Mn below 45,000.

In another embodiment, the present invention encompasses the use of a hydrophobically modified cellulosic polymer in a liquid detergent composition to improve the sudsing profile, in particular initial suds, suds mileage and suds density.

DETAILED DESCRIPTION OF THE INVENTION

As used herein "suds profile" means amount of sudsing (high or low) and the persistence of sudsing (sustained or prevention) throughout the washing process resulting from the use of the liquid detergent composition of the present composition. Liquid dishwashing detergent compositions require high sudsing and sustained suds.

As used herein "dishware" means a surface such as dishes, glasses, pots, pans, baking dishes and flatware made from ceramic, china, metal, glass, plastic (polyethylene, polypropylene, polystyrene, etc.) and wood.

As used herein "light-duty liquid dishwashing detergent composition" refers to those compositions that are employed in manual (i.e. hand) dishwashing. Such compositions are generally high sudsing or foaming in nature.

As used herein "cleaning" means applying to a surface for the purpose of cleaning, and/or disinfecting.

As used herein "grease" means materials comprising at least in part (i.e., at least 0.5 wt % by weight of the grease) saturated and unsaturated fats and oils, preferably oils and fats derived from animal sources such as beef and/or chicken.

As used herein "baked-on grease" means materials comprising grease exposed to increased temperatures in a standard oven, convection oven, toaster oven, microwave oven, stove top heating using a frying pan, wok, hot plate, electric griddle, or other known cooking appliances used to heat food during cooking.

The present application is directed to a light duty liquid dishwashing detergent composition comprising a hydrophobically modified cellulosic polymer with a Mn below 45,000.

It has been surprisingly found that the hydrophobically modified cellulosic polymers in the compositions of the present invention, provide improved suds mileage, will increase the suds mileage and total suds volume. This can allow to formulate a composition with a reduced level of surfactants while maintaining an equal suds mileage performance.

It has been further found that such hydrophobically modified cellulosic polymers provide improved foam aesthetics. They provide a higher initial foam volume and foam density as well as whiter and denser foam.

Finally, it has been found that such hydrophobically modified cellulosic polymers provide excellent grease cleaning, especially baked-on grease stains and soils.

The Hydrophobically Modified Cellulosic Polymer

The hydrophobically modified cellulosic polymer has a number average molecular weight (Mn) below 45,000; preferably comprised between 10,000 and 40,000; preferably between 13,000 and 25,000. Indeed, the object of the present invention is to provide a liquid detergent composition with an improved suds profile. It has been found that the hydrophobically modified cellulosic polymer with such Mn provide excellent suds profile while do not impact the viscosity of the composition. It has been found that increasing the Mn of such polymer would result in increased viscosity and would make compositions in the form of gel. This would lead to processability and dissolution difficulties.

The composition of the present invention will typically comprise the hydrophobically modified cellulosic polymer at a level of from 0.01% to 2%, preferably from 0.1% to 0.5% by weight of the total composition.

The hydrophobically modified cellulosic polymers of the present invention include water soluble cellulose ether derivatives, such as nonionic and cationic cellulose derivatives. Nonionic cellulose derivatives are especially preferable. The basic structure of the cellulose derivative is illustrated by the following formula:

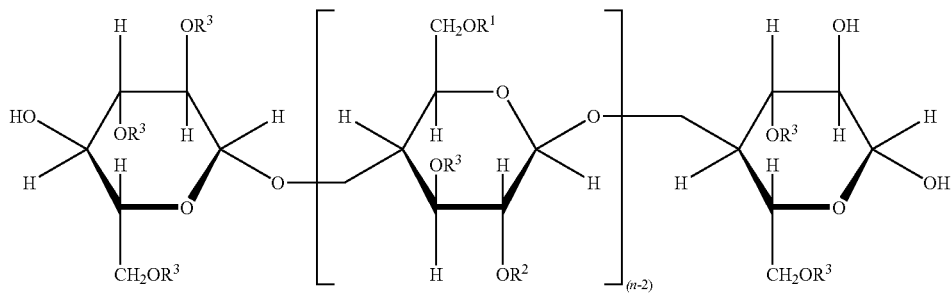

where polymerization degree n is an integer in the range of from 50 and 240. In the structure, $R^1$, $R^2$ and $R^3$ represent alkyl, hydroxyalkyl, or mixed alkyl and hydroxyalkyl substituents, as described hereinafter. Useful alkyl groups include methyl, ethyl, propyl, butyl, pentyl, isobutyl, hexyl, nonyl, and the like; preferably methyl, ethyl, propyl, butyl, more preferably methyl. Useful hydroxyalkyl groups include hydroxymethyl, hydroxyethyl, hydroxypropyl and hydroxybutyl. $R^3$ can also represent H.

$R^1$ is preferably methyl; $R^2$ is preferably methyl (Fig. A) or hydroxypropyl (Fig. B).

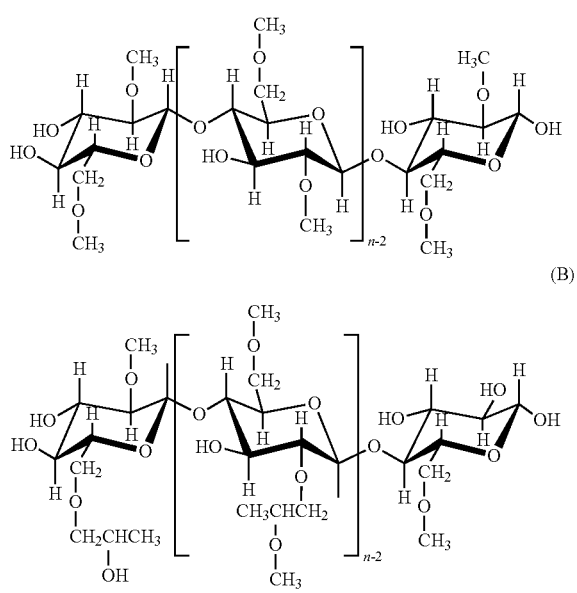

The degree of substitution, which is the amount of substituent groups on the anhydroglucose units of cellulose is described by the average number of substituent groups attached to the ring, can be for methoxyl groups from 0.1 to 2.0, preferably methoxyl degree of substitution is from 1.8 to 2.0; for hydroxypropyl groups from 0 to 1.0, preferably hydroxypropyl degree of substitution is from 0.2 to 0.8.

Preferred group of cellulose derivatives include methylcellulose, hydroxypropyl methylcellulose, hydroxyethyl methylcellulose, and mixtures thereof.

Commercially available examples include Methocel E50 PVC and E19 PVC from Dow Chemical and Walocel from Wolff Cellulosics.

Other cellulose derivatives which may be useful in the compositions of the present invention include:—Quaternized cationic celluloses modified with hydrophobic groups, typically alkyl, alkaryl or aralkyl groups comprising 1 to 30 carbon atoms, preferably 8 to 30 carbons atoms, more preferably 8 to 22 carbon atoms. One example of a cationic cellulose derivative is

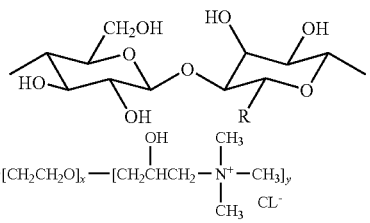

$$R = CH_2O-[CH_2CH_2O]_x-[CH_2CHCH_2-\overset{+}{\underset{CH_3}{\underset{|}{N}}}-CH_3]_y \quad CL^-$$

Viscosity Test Method

The viscosity of the composition of the present invention is measured on a Brookfield viscometer model # LVDVII+ at 20° C. The spindle used for these measurements is S31 with a speed of 10 rpm. The liquid detergent compositions of the present invention have preferably a viscosity lower than 3,000 cps, more preferably lower than 2,000 and typically greater than 300 cps, preferably the viscosity of the composition is between 300 and 1100 cps.

Aqueous Liquid Carrier

The liquid detergent compositions herein further contain from 30% to 80% of an aqueous liquid carrier in which the other essential and optional compositions components are dissolved, dispersed or suspended. More preferably the aqueous liquid carrier will comprise from 45% to 70%, more preferable from 45% to 65% of the compositions herein.

One preferred component of the aqueous liquid carrier is water. The aqueous liquid carrier, however, may contain other materials which are liquid, or which dissolve in the liquid carrier, at room temperature (20° C.-25° C.) and which may also serve some other function besides that of an inert filler. Such materials can include, for example, hydrotropes and solvents, discussed in more detail below. Dependent on the geography of use of the liquid detergent composition of the present invention, the water in the aqueous liquid carrier can have a hardness level of about 2-30 gpg ("gpg" is a measure of water hardness that is well known to those skilled in the art, and it stands for "grains per gallon").

pH of the Composition

The liquid detergent composition may have any suitable pH. Preferably the pH of the composition is adjusted to between 4 and 14. More preferably the composition has pH of between 6 and 13, most preferably between 6 and 10. The pH of the composition can be adjusted using pH modifying ingredients known in the art.

Cleaning Polymer

An optional but preferred further ingredient of the compositions of the present invention are cleaning polymers. Those polymers provide improved grease cleaning benefit and/or allow to obtain the same cleaning performance while lowering the required level of surfactants. Those are for example:
(i) an alkoxylated polyethyleneimine polymer comprising a polyethyleneimine backbone having from 400 to 10000 weight average molecular weight and the alkoxylated polyethyleneimine polymer further comprises: (1) one or two alkoxylation modifications per nitrogen atom by a polyalkoxylene chain having an average of about 1 to about 30 alkoxy moieties per modification, wherein the terminal alkoxy moiety of the alkoxylation modification is capped with hydrogen, a $C_1$-$C_4$ alkyl or mixtures thereof; (2) a substitution of one $C_1$-$C_4$ alkyl moiety and one or two alkoxylation modifications per nitrogen atom by a polyalkoxylene chain having an average of about 1 to about 40 alkoxy moieties per modification wherein the terminal alkoxy moiety is capped with hydrogen, a $C_1$-$C_4$ alkyl or mixtures thereof; or (3) a combination thereof. They are generally comprised at a level of 0.1% to 10% by weight of the composition. These polymers are further described on pages 2, line 33 to page 7, line 9 of WO2007/135645, internationally filed on 21 May 2007 by The Procter & Gamble Company.
(ii) a random graft copolymer having a hydrophilic backbone comprising monomers selected from the group consisting of unsaturated $C_{1-6}$ acids, ethers, alcohols, aldehydes, ketones or esters, sugar units, alkoxy units, maleic anhydride and saturated polyalcohols such as glycerol, and mixtures thereof, and hydrophobic side chains selected from the group comprising a $C_{4-25}$ alkyl group, polypropylene; polybutylene, a vinyl ester of a saturated monocarboxylic acid containing from 1 to 6 carbon atoms; a $C_{1-6}$ alkyl ester of acrylic or methacrylic acid; and a mixture thereof. These polymers are further described on page 5, line 12 to page 16 in the patent application filed by the Procter & Gamble Company under the number EP07111413.6 on Jun. 29, 2007.

Surfactants

A preferred further ingredient of the composition of the present invention is a surfactant selected from nonionic, anionic, cationic surfactants, ampholytic, zwitterionic, semipolar nonionic surfactants, and mixtures thereof. Surfactants can be comprised at a level of from 1.0% to 50% by weight, preferably from 5% to 40% by weight, more preferably from 25% to 40% by weight preferably from 30% to 38% by weight of the liquid detergent composition. Non-limiting examples of optional surfactants are discussed below.

Anionic Surfactants

Sulphate or Sulphonate Surfactants

The sulphate or sulphonate surfactant is typically present at a level of at least 5%, preferably from 5% to 40% and more preferably from 15% to 30% and even more preferably at 15% to 25% by weight of the liquid detergent composition.

Suitable sulphate or sulphonate surfactants for use in the compositions herein include water-soluble salts or acids of $C_{10}$-$C_{14}$ alkyl or hydroxyalkyl, sulphate or sulphonates. Suitable counterions include hydrogen, alkali metal cation or ammonium or substituted ammonium, but preferably sodium.

Where the hydrocarbyl chain is branched, it preferably comprises $C_{1-4}$ alkyl branching units. The average percentage branching of the sulphate or sulphonate surfactant is preferably greater than 30%, more preferably from 35% to 80% and most preferably from 40% to 60% of the total hydrocarbyl chains.

The sulphate or sulphonate surfactants may be selected from $C_{11-18}$ alkyl benzene sulphonates (LAS), $C_8$-$C_{20}$ primary, branched-chain and random alkyl sulphates (AS); $C_{10}$-$C_{18}$ secondary (2,3) alkyl sulphates; $C_{10}$-$C_{18}$ alkyl alkoxy sulphates ($AE_xS$) wherein preferably x is from 1-30; $C_{10}$-$C_{18}$ alkyl alkoxy carboxylates preferably comprising 1-5 ethoxy units; mid-chain branched alkyl sulphates as discussed in U.S. Pat. No. 6,020,303 and U.S. Pat. No. 6,060,443; mid-chain branched alkyl alkoxy sulphates as discussed in U.S. Pat. No. 6,008,181 and U.S. Pat. No. 6,020,303; modified alkylbenzene sulphonate (MLAS) as discussed in WO 99/05243, WO 99/05242, WO 99/05244, WO 99/05082, WO 99/05084, WO 99/05241, WO 99/07656, WO 00/23549, and WO 00/23548; methyl ester sulphonate (MES); and alpha-olefin sulphonate (AOS).

The paraffin sulphonates may be monosulphonates or disulphonates and usually are mixtures thereof, obtained by sulphonating paraffins of 10 to 20 carbon atoms. Preferred sulphonates are those of C12-18 carbon atoms chains and more preferably they are C14-17 chains. Paraffin sulphonates that have the sulphonate group(s) distributed along the paraffin chain are described in U.S. Pat. No. 2,503,280; U.S. Pat. No. 2,507,088; U.S. Pat. No. 3,260,744; U.S. Pat. No. 3,372,188 and in DE 735 096.

Alkyl glyceryl sulphonate surfactants and/or alkyl glyceryl sulphate surfactants generally used have high monomer content (greater than 60 wt % by weight of the alkyl glycerol sulphonate surfactant). As used herein "oligomer" includes dimer, trimer, quadrimer, and oligomers up to heptamers of alkyl glyceryl sulphonate surfactant and/or alkyl glyceryl sulphate surfactant. Minimization of the monomer content may be from 0 wt % to 60 wt %, from 0 wt % to 55 wt %, from 0 wt % to 50 wt %, from 0 wt % to 30 wt %, by weight of the alkyl glyceryl sulphonate surfactant and/or alkyl glyceryl sulphate surfactant present. The alkyl glyceryl sulphonate surfactant and/or alkyl glyceryl sulphate surfactant for use herein include such surfactants having an alkyl chain length from $C_{10-40}$, $C_{10-22}$, $C_{12-18}$, and $C_{16-18}$. The alkyl chain may be branched or linear, wherein when present, the branches comprise a $C_{1-4}$ alkyl moiety, such as methyl ($C_1$) or ethyl ($C_2$). These surfactants are described on page 2, line 32 to page 4, line 21 and the process of making them on page 4, line 22 to page 6, line 3 of WO2006/041740 published on Apr. 20, 2006 by The Procter & Gamble Company. The alkyl glyceryl sulphate/sulphonate surfactant is optionally present at a level of at least 10%, more preferably from 10% to 40% and most preferably from 10% to 30% by weight of the composition.

Dialkylsulfosuccinates: The dialkyl sulfosuccinates may be a $C_{6-15}$ linear or branched dialkyl sulfosuccinate. The alkyl moieties may be symmetrical (i.e., the same alkyl moieties) or asymmetrical (i.e., different alkyl moieties). Preferably, the alkyl moiety is symmetrical. The dialkyl sulfosuccinates may be present in the liquid detergent composition from 0.5% to 10% by weight of the composition.

Nonionic Surfactants

Nonionic surfactants, when present in the composition, are present in an effective amount, more preferably from 0.1% to 20%, by weight of the liquid detergent composition. Suitable nonionic surfactants include the condensation products of aliphatic alcohols with from 1 to 25 moles of ethylene oxide. The alkyl chain of the aliphatic alcohol can either be straight or branched, primary or secondary, and generally contains from 8 to 22 carbon atoms. Particularly preferred are the condensation products of alcohols having an alkyl group containing from 10 to 20 carbon atoms with from 2 to 18 moles of ethylene oxide per mole of alcohol. Also suitable are alkylpolyglycosides having the formula $R^2O(C_nH_{2n}O)_t$ (glycosyl)$_x$ (formula (III)), wherein $R^2$ of formula (III) is selected from the group consisting of alkyl, alkyl-phenyl, hydroxyalkyl, hydroxyalkylphenyl, and mixtures thereof in which the alkyl groups contain from 10 to 18, preferably from 12 to 14, carbon atoms; n of formula (III) is 2 or 3, preferably 2; t of formula (III) is from 0 to 10, preferably 0; and x of formula (III) is from 1.3 to 10, preferably from 1.3 to 3, most preferably from 1.3 to 2.7. The glycosyl is preferably derived from glucose.

Also suitable are fatty acid amide surfactants having the formula (IV):

(IV)

wherein $R^6$ of formula (IV) is an alkyl group containing from 7 to 21, preferably from 9 to 17, carbon atoms and each $R^7$ of formula (IV) is selected from the group consisting of hydrogen, $C_1$-$C_4$ alkyl, $C_1$-$C_4$ hydroxyalkyl, and —$(C_2H_4O)_xH$ where x of formula (IV) varies from 1 to 3. Preferred amides are $C_8$-$C_{20}$ ammonia amides, monoethanolamides, diethanolamides, and isopropanolamides.

Cationic Surfactants

Cationic surfactants, when present in the composition, are present in an effective amount, more preferably from 0.1% to 20%, by weight of the liquid detergent composition. Suitable cationic surfactants are quaternary ammonium surfactants. Suitable quaternary ammonium surfactants are selected from the group consisting of mono $C_6$-$C_{16}$, preferably $C_6$-$C_{10}$ N-alkyl or alkenyl ammonium surfactants, wherein the remaining N positions are substituted by methyl, hydroxyethyl or hydroxypropyl groups. Another preferred cationic surfactant is an $C_6$-$C_{18}$ alkyl or alkenyl ester of a quaternary ammonium alcohol, such as quaternary chlorine esters. More preferably, the cationic surfactants have the formula (V):

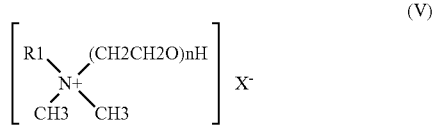

(V)

wherein R1 of formula (V) is $C_8$-$C_{18}$ hydrocarbyl and mixtures thereof, preferably, $C_8$-$C_{14}$ alkyl, more preferably, $C_8$, $C_{10}$ or $C_{12}$ alkyl, and X of formula (V) is an anion, preferably, chloride or bromide.

Amine Oxide Surfactants

Preferred ingredients for the liquid detergent compositions are amine oxides surfactants which typically herein may be comprised at a level of from 0.1% to 15% by weight, preferably from 3.0% to 10% by weight of the liquid detergent composition. The amine oxide may have a linear or mid-branched alkyl moiety.

Linear amine oxides, for optional use herein, include water-soluble amine oxides containing one $C_{8-18}$ alkyl moiety and 2 moieties selected from the group consisting of $C_{1-3}$ alkyl groups and $C_{1-3}$ hydroxyalkyl groups; water-soluble phosphine oxides containing one $C_{10}$-18 alkyl moiety and 2 moieties selected from the group consisting of $C_{1-3}$ alkyl groups and $C_{1-3}$ hydroxyalkyl groups; and water-soluble sulfoxides containing one $C_{10-18}$ alkyl moiety and a moiety selected from the group consisting of $C_{1-3}$ alkyl and $C_{1-3}$ hydroxyalkyl moieties.

Preferred amine oxide surfactants have formula (VI):

(VI)

wherein $R^3$ of formula (VI) is an linear $C_{8-22}$ alkyl, linear $C_{8-22}$ hydroxyalkyl, $C_{8-22}$ alkyl phenyl group, and mixtures thereof; $R^4$ of formula (VI) is an $C_{2-3}$ alkylene or $C_{2-3}$ hydroxyalkylene group or mixtures thereof; x is from 0 to about 3; and each $R^5$ of formula (VI) is an $C_{1-3}$ alkyl or $C_{1-3}$ hydroxyalkyl group or a polyethylene oxide group containing an average of from about 1 to about 3 ethylene oxide groups. The $R^5$ groups of formula (VI) may be attached to each other, e.g., through an oxygen or nitrogen atom, to form a ring structure.

The linear amine oxide surfactants in particular may include linear $C_{10}$-$C_{18}$ alkyl dimethyl amine oxides and linear $C_8$-$C_{12}$ alkoxy ethyl dihydroxy ethyl amine oxides. Preferred amine oxides include linear $C_{10}$, linear $C_{10}$-$C_{12}$, and linear $C_{12}$-$C_{14}$ alkyl dimethyl amine oxides.

As used herein "mid-branched" means that the amine oxide has one alkyl moiety having $n_1$ carbon atoms with one alkyl branch on the alkyl moiety having $n_2$ carbon atoms. The alkyl branch is located on the α carbon from the nitrogen on the alkyl moiety. This type of branching for the amine oxide is also known in the art as an internal amine oxide. The total sum of $n_1$ and $n_2$ is from 10 to 24 carbon atoms, preferably from 12 to 20, and more preferably from 10 to 16. The number of carbon atoms for the one alkyl moiety ($n_1$) should be approximately the same number of carbon atoms as the one alkyl branch ($n_2$) such that the one alkyl moiety and the one alkyl branch are symmetric. As used herein "symmetric" means that $|n_1-n_2|$ is less than or equal to 5, preferably 4, most preferably from 0 to 4 carbon atoms in at least 50 wt %, more preferably at least 75 wt % to 100 wt % of the mid-branched amine oxides for use herein.

The amine oxide further comprises two moieties, independently selected from a $C_{1-3}$ alkyl, a $C_{1-3}$ hydroxyalkyl group, or a polyethylene oxide group containing an average of from about 1 to about 3 ethylene oxide groups. Preferably the two moieties are selected from a $C_{1-3}$ alkyl, more preferably both are selected as a $C_1$ alkyl.

Amphoteric Surfactants

Other suitable, non-limiting examples of amphoteric detergent surfactants that are optional in the present invention include amido propyl betaines and derivatives of aliphatic or heterocyclic secondary and ternary amines in which the aliphatic moiety can be straight chain or branched and wherein one of the aliphatic substituents contains from 8 to 24 carbon atoms and at least one aliphatic substituent contains an anionic water-solubilizing group. Typically, when present, amphoteric surfactants comprise from 0.01% to 20%, preferably from 0.5% to 10% by weight of the liquid detergent composition.

Magnesium Ions

The optional presence of magnesium ions may be utilized in the detergent composition when the compositions are used in softened water that contains few divalent ions. When utilized, the magnesium ions preferably are added as a hydroxide, chloride, acetate, sulphate, formate, oxide or nitrate salt to the compositions of the present invention. When included, the magnesium ions are present at an active level of from 0.01% to 1.5%, preferably from 0.015% to 1%, more preferably from 0.025% to 0.5%, by weight of the liquid detergent composition.

Solvent

The present compositions may optionally comprise a solvent. Suitable solvents include $C_{4-14}$ ethers and diethers, glycols, alkoxylated glycols, $C_6$-$C_{16}$ glycol ethers, alkoxylated aromatic alcohols, aromatic alcohols, aliphatic branched alcohols, alkoxylated aliphatic branched alcohols, alkoxylated linear $C_1$-$C_5$ alcohols, linear $C_1$-$C_5$ alcohols, amines, $C_8$-$C_{14}$ alkyl and cycloalkyl hydrocarbons and halohydrocarbons, and mixtures thereof. When present, the liquid detergent composition will contain from 0.01% to 20%, preferably from 0.5% to 20%, more preferably from 1% to 10% by weight of the liquid detergent composition of a solvent. These solvents may be used in conjunction with an aqueous liquid carrier, such as water, or they may be used without any aqueous liquid carrier being present.

Hydrotrope

The liquid detergent compositions of the invention may optionally comprise a hydrotrope in an effective amount so that the liquid detergent compositions are appropriately compatible in water. Suitable hydrotropes for use herein include anionic-type hydrotropes, particularly sodium, potassium, and ammonium xylene sulphonate, sodium, potassium and ammonium toluene sulphonate, sodium potassium and ammonium cumene sulphonate, and mixtures thereof, and related compounds, as disclosed in U.S. Pat. No. 3,915,903. The liquid detergent compositions of the present invention typically comprise from 0% to 15% by weight of the liquid detergent composition of a hydrotropic, or mixtures thereof, preferably from 1% to 10%, most preferably from 3% to 6% by weight.

Polymeric Suds Stabilizer

The compositions of the present invention may optionally contain a polymeric suds stabilizer. These polymeric suds stabilizers provide extended suds volume and suds duration of the liquid detergent compositions. These polymeric suds stabilizers may be selected from homopolymers of (N,N-dialkylamino) alkyl esters and (N,N-dialkylamino) alkyl acrylate esters. The weight average molecular weight of the polymeric suds boosters, determined via conventional gel permeation chromatography, is from 1,000 to 2,000,000, preferably from 5,000 to 1,000,000, more preferably from 10,000 to 750,000, more preferably from 20,000 to 500,000, even more preferably from 35,000 to 200,000. The polymeric suds stabilizer can optionally be present in the form of a salt, either an inorganic or organic salt, for example the citrate, sulphate, or nitrate salt of (N,N-dimethylamino)alkyl acrylate ester.

One preferred polymeric suds stabilizer is (N,N-dimethylamino)alkyl acrylate esters, namely the acrylate ester represented by the formula (VII):

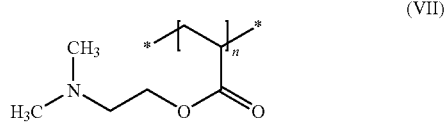

(VII)

When present in the compositions, the polymeric suds booster may be present in the composition from 0.01% to 15%, preferably from 0.05% to 10%, more preferably from 0.1% to 5%, by weight of the liquid detergent composition.

Diamines

Another optional ingredient of the compositions according to the present invention is a diamine. Since the habits and practices of the users of liquid detergent compositions show considerable variation, the composition will preferably contain 0% to 15%, preferably 0.1% to 15%, preferably 0.2% to 10%, more preferably 0.25% to 6%, more preferably 0.5% to 1.5% by weight of said composition of at least one diamine.

Preferred organic diamines are those in which pK1 and pK2 are in the range of 8.0 to 11.5, preferably in the range of 8.4 to 11, even more preferably from 8.6 to 10.75. Preferred materials include 1,3-bis(methylamine)-cyclohexane (pKa=10 to 10.5), 1,3 propane diamine (pK1=10.5; pK2=8.8), 1,6 hexane diamine (pK1=11; pK2=10), 1,3 pentane diamine (DYTEK EP®) (pK1=10.5; pK2=8.9), 2-methyl 1,5 pentane diamine (DYTEK A®) (pK1=11.2; pK2=10.0). Other preferred materials include primary/primary diamines with alkylene spacers ranging from $C_4$ to $C_8$. In general, it is believed that primary diamines are preferred over secondary and tertiary diamines.

Definition of pK1 and pK2—As used herein, "pKa1" and "pKa2" are quantities of a type collectively known to those skilled in the art as "pKa" pKa is used herein in the same manner as is commonly known to people skilled in the art of chemistry. Values referenced herein can be obtained from literature, such as from "Critical Stability Constants: Volume 2, Amines" by Smith and Martel, Plenum Press, NY and London, 1975. Additional information on pKa's can be obtained from relevant company literature, such as information supplied by DUPONT®, a supplier of diamines. As a working definition herein, the pKa of the diamines is specified in an all-aqueous solution at 25° C. and for an ionic strength between 0.1-0.5 M.

Carboxylic Acid

The liquid detergent compositions according to the present invention may comprise a linear or cyclic carboxylic acid or salt thereof to improve the rinse feel of the composition. Carboxylic acids useful herein include $C_{1-6}$ linear or at least 3 carbon containing cyclic acids. The linear or cyclic carbon-containing chain of the carboxylic acid or salt thereof may be substituted with a substituent group selected from the group consisting of hydroxyl, ester, ether, aliphatic groups having from 1 to 6, more preferably 1 to 4 carbon atoms, and mixtures thereof.

Preferred carboxylic acids are those selected from the group consisting of salicylic acid, maleic acid, acetyl salicylic acid, 3 methyl salicylic acid, 4 hydroxy isophthalic acid, dihydroxyfumaric acid, 1, 2, 4 benzene tricarboxylic acid, pentanoic acid and salts thereof and mixtures thereof. Where the carboxylic acid exists in the salt form, the cation of the salt is preferably selected from alkali metal, alkaline earth metal, monoethanolamine, diethanolamine or triethanolamine and mixtures thereof.

The carboxylic acid or salt thereof, when present, is preferably present at the level of from 0.1% to 5%, more preferably from 0.2% to 1% and most preferably from 0.25% to 0.5%.

Preferably, the liquid detergent compositions herein are formulated as clear liquid compositions. By "clear" it is meant stable and transparent. In order to achieve clear compositions, the use of solvents and hydrotropes is well known to those familiar with the art of light-duty liquid dishwashing compositions. Preferred liquid detergent compositions in accordance with the invention are clear single phase liquids, but the invention also embraces clear and opaque products containing dispersed phases, such as beads or pearls as described in U.S. Pat. No. 5,866,529, to Erilli, et al., and U.S.

Pat. No. 6,380,150, to Toussaint, et al., provided that such products are physically stable (i.e., do not separate) on storage.

The liquid detergent compositions of the present invention may be packages in any suitable packaging for delivering the liquid detergent composition for use. Preferably the package is a clear package made of glass or plastic.

Other Optional Components:

The liquid detergent compositions herein can further comprise a number of other optional ingredients suitable for use in liquid detergent compositions such as perfume, dyes, opacifiers, enzymes, chelants, thickening agents and pH buffering means so that the liquid detergent compositions herein generally have a pH of from 4 to 14, preferably 6 to 13, most preferably 6 to 10. A further discussion of acceptable optional ingredients suitable for use in light-duty liquid detergent composition may be found in U.S. Pat. No. 5,798,505.

The Process of Cleaning/Treating a Dishware

The process comprises generally the steps of applying said composition onto said dishware, typically in diluted or neat form and rinsing or leaving said composition to dry on said surface without rinsing said surface.

By "in its neat form", it is meant herein that said liquid composition is applied directly onto the surface to be treated without undergoing any dilution by the user (immediately) prior to the application. By "diluted form", it is meant herein that said liquid composition is diluted by the user with an appropriate solvent, typically with water. By "rinsing", it is meant herein contacting the dishware cleaned with the process according to the present invention with substantial quantities of appropriate solvent, typically water, after the step of applying the liquid composition herein onto said dishware. By "substantial quantities", it is meant usually 5 to 20 liters.

In one embodiment, the composition herein can be applied in its diluted form. Soiled dishes are contacted with an effective amount, typically from 0.5 ml. to 20 ml (per 25 dishes being treated), preferably from 3 ml to 10 ml, of the liquid detergent composition of the present invention diluted in water. The actual amount of liquid detergent composition used will be based on the judgment of user, and will typically depend upon factors such as the particular product formulation of the composition, including the concentration of active ingredients in the composition, the number of soiled dishes to be cleaned, the degree of soiling on the dishes, and the like. The particular product formulation, in turn, will depend upon a number of factors, such as the intended market (i.e., U.S., Europe, Japan, etc.) for the composition product. Suitable examples may be seen below in Table A.

Generally, from 0.01 ml to 150 ml, preferably from 3 ml to 40 ml of a liquid detergent composition of the invention is combined with from 2000 ml to 20000 ml, more typically from 5000 ml to 15000 ml of water in a sink having a volumetric capacity in the range of from 1000 ml to 20000 ml, more typically from 5000 ml to 15000 ml. The soiled dishes are immersed in the sink containing the diluted compositions then obtained, where contacting the soiled surface of the dish with a cloth, sponge, or similar article cleans them. The cloth, sponge, or similar article may be immersed in the detergent composition and water mixture prior to being contacted with the dish surface, and is typically contacted with the dish surface for a period of time ranged from 1 to 10 seconds, although the actual time will vary with each application and user. The contacting of cloth, sponge, or similar article to the dish surface is preferably accompanied by a concurrent scrubbing of the dish surface.

Another method will comprise immersing the soiled dishes into a water bath or held under running water without any liquid dishwashing detergent. A device for absorbing liquid dishwashing detergent, such as a sponge, is placed directly into a separate quantity of undiluted liquid dishwashing composition for a period of time typically ranging from 1 to 5 seconds. The absorbing device, and consequently the undiluted liquid dishwashing composition, is then contacted individually to the surface of each of the soiled dishes to remove said soiling. The absorbing device is typically contacted with each dish surface for a period of time range from 1 to 10 seconds, although the actual time of application will be dependent upon factors such as the degree of soiling of the dish. The contacting of the absorbing device to the dish surface is preferably accompanied by concurrent scrubbing.

EXAMPLES

TABLE A

| Light-Duty Liquid Dishwashing Detergent Compositions | | | | | | | |
|---|---|---|---|---|---|---|---|
| Composition | A | B | C | D | E | F | G |
| $C_{12-13}$ AE0xS[1] | 22.2 | 28.0 | 26.0 | 26.0 | 15.0 | 15.0 | 10.0 |
| $C_{10-14}$ Amine Oxide | 4.7 | 6.0 | 6.0 | 6.0 | 3.5 | 3.5 | 3.0 |
| $C_{11}E_9$ Nonionic[2] | 1.8 | 2.0 | — | — | — | — | — |
| LAS | — | 2.0 | — | — | — | — | 15.0 |
| HPMC[5] | 0.2 | 0.1 | 0.2 | 0.1 | 0.3 | 0.3 | 0.2 |
| Polyethyleniminie polymer[6] and/or PEG-grafted PVAc[7] | — | — | 0.8 | 1.5 | 0.5 | — | — |
| Solvents and salts including Ethanol, NaCl and/or polypropylene glycol | 4.0 | 4.8 | 4.0 | 3.0 | 2.0 | 2.5 | 5.0 |
| 1,3 BAC Diamine[3] | — | 0.5 | — | — | — | — | — |
| Suds boosting polymer[4] | — | 0.1 | — | 0.1 | — | — | — |
| Water and minors | Balance | Balance | Balance | Balance | Balance | Balance | Balance |

[1]$C_{12-13}$ alkyl ethoxy sulphonate containing an average of x = from 0.5 to 3 ethoxy groups.
[2]Nonionic is $C_{10-11}$ Alkyl ethoxylated surfactant containing 8-9 ethoxy
[3]1,3, BAC is 1,3 bis(methylamine)-cyclohexane.
[4](N,N-dimethylamino)ethyl methacrylate homopolymer
[5]Hydroxy propyl methyl cellulose: Methocell E50 PVC having a Mn 23,000
[6]Alkoxylated polyethyleneimine polymer, PEI600 or PEI5000 with 7-10 ethoxy moieties (EO) and 0-7 propoxy moieties (PO) per nitrogen of the polyethyleneimine backbone (NH).
[7]A 6,000-12,000 g/mol Mw polyethylene glycol backbone grafted at 70° C. with 54-60% vinyl acetate by weight of the resulting polymer, optionally with 40% of ester links hydrolyzed.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

What is claimed is:

1. A liquid detergent composition comprising from about 0.1% to about 0.3%, by weight of the liquid detergent composition, of a water soluble hydrophobically modified cellulosic polymer having a Mn between about 13,000 and about 25,000 and wherein said polymer is dissolved in an aqueous carrier and said liquid detergent composition has a viscosity of from about 300 cps to about 650 cps, wherein the hydrophobically modified cellulosic polymer is a nonionic hydrophobically modified cellulosic polymer of the following formula:

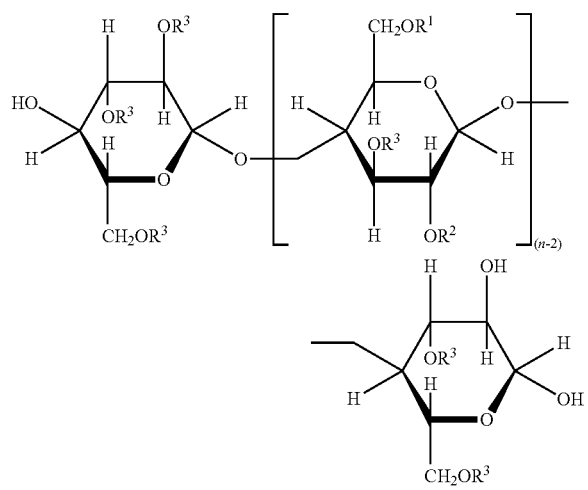

where polymerization degree n is an integer in the range of from 50 and 240; $R^1$ and $R^2$ represents alkyl, hydroxyalkyl, or mixed alkyl and hydroxyalkyl substituents; and $R^3$ represents hydrogen, alkyl, hydroxyalkyl, or mixed alkyl and hydroxyalkyl substituents, wherein the liquid detergent composition comprises from about 3% to about 15%, by weight of the liquid detergent composition, of an amine oxide and the liquid detergent composition comprises from about 15% to about 40%, by weight of the liquid detergent composition, of an anionic surfactant selected from the group consisting of $C_{10}$-$C_{14}$ alkyl or hydroxyalkyl sulphate or sulphonate and mixtures thereof, wherein the liquid detergent composition is a clear single phase liquid.

2. A liquid detergent composition according to claim 1 wherein the alkyl group is selected from the group consisting of methyl, ethyl, propyl, butyl, pentyl, isobutyl, hexyl, nonyl, and mixtures thereof.

3. A liquid detergent composition according to claim 1 wherein the hydroxyalkyl group is selected from the group consisting of hydroxymethyl, hydroxyethyl, hydroxypropyl, hydroxybutyl and mixtures thereof.

4. A liquid detergent compositions according to claim 1 wherein the hydrophobically modified cellulosic polymer is selected from the group consisting of methylcellulose, hydroxypropyl methyl cellulose, hydroxyethyl methyl cellulose, and mixtures thereof.

5. The liquid detergent composition according to claim 1 further comprising from 0.1% to 20% by weight of the liquid detergent composition of a nonionic surfactant selected from the group consisting of $C_8$-$C_{22}$ aliphatic alcohols with 1 to 25 moles of ethylene oxide, alkylpolyglycosides, fatty acid amide surfactants, and mixtures thereof.

6. A method of washing dishes with the liquid detergent composition according to claim 1, wherein 0.01 ml to 150 ml of said liquid detergent composition is diluted in 2000 ml to 20000 ml water, and the dishes are immersed in the diluted composition thus obtained and cleaned by contacting the soiled surface of the dish with a cloth, a sponge or a similar article.

7. A method of washing dishes, wherein the dishes are immersed in a water bath or held under running water and an effective amount of a liquid detergent composition according to claim 1, is absorbed onto a device, and the device with the absorbed liquid detergent composition is contacted individually to the surface of each of the soiled dishes.

* * * * *